US012597229B2

(12) United States Patent
Miyamoto et al.

(10) Patent No.: US 12,597,229 B2
(45) Date of Patent: Apr. 7, 2026

(54) INFORMATION PROCESSING APPARATUS, INFORMATION PROCESSING METHOD, AND PROGRAM

(71) Applicants: MEIJI UNIVERSITY, Tokyo (JP); NS Solutions Corporation, Tokyo (JP)

(72) Inventors: Ryusuke Miyamoto, Kawasaki (JP); Sei Sato, Tokyo (JP)

(73) Assignees: MEIJI UNIVERSITY, Tokyo (JP); NS Solutions Corporation, Tokyo (JP)

( * ) Notice: Subject to any disclaimer, the term of this patent is extended or adjusted under 35 U.S.C. 154(b) by 394 days.

(21) Appl. No.: 18/277,035

(22) PCT Filed: Feb. 7, 2022

(86) PCT No.: PCT/JP2022/004650
    § 371 (c)(1),
    (2) Date: Aug. 11, 2023

(87) PCT Pub. No.: WO2022/209301
    PCT Pub. Date: Oct. 6, 2022

(65) Prior Publication Data
    US 2024/0046609 A1     Feb. 8, 2024

(30) Foreign Application Priority Data
    Mar. 31, 2021     (JP) ................................. 2021-060383

(51) Int. Cl.
    *G06V 10/75*          (2022.01)
    *G06V 10/44*          (2022.01)
(52) U.S. Cl.
    CPC ............ *G06V 10/751* (2022.01); *G06V 10/44* (2022.01)

(58) Field of Classification Search
    CPC .... G06V 10/751; G06V 10/44; G06V 10/764; G06V 10/774; G06V 10/82
    See application file for complete search history.

(56) References Cited

U.S. PATENT DOCUMENTS 7,227,552 B1 *   6/2007   Saito .................... H04N 1/6077
                                                     345/589
11,967,123 B1 *  4/2024   Shi ............................ G06T 5/40
                        (Continued)

FOREIGN PATENT DOCUMENTS

JP          2002288670 A    10/2002
JP          2003281541 A    10/2003
                        (Continued)

OTHER PUBLICATIONS

International Search Report and Written Opinion in corresponding PCT/JP2022/004650 mailed Apr. 26, 2022, partial translation.

*Primary Examiner* — Aaron W Carter
(74) *Attorney, Agent, or Firm* — ArentFox Schiff LLP

(57) ABSTRACT

An appearance of a desired change can be detected in a more preferred manner even under circumstances where various kinds of changes can appear in a target image. An information processing apparatus includes: a generator configured to generate a normalized image by performing a normalization process using a learned model constructed in advance based on a machine learning with a plurality of normal images as input, on an input image; a determiner configured to determine whether the normalized image and a prescribed reference image approximately match or not; and an outputter configured to output notification information according to a result of the determination to a prescribed output destination.

17 Claims, 11 Drawing Sheets

(56)                References Cited

U.S. PATENT DOCUMENTS

| | | | | |
|---|---|---|---|---|
| 12,399,423 | B2 * | 8/2025 | Tao | G03F 7/70125 |
| 2003/0016198 | A1 * | 1/2003 | Nagai | G09G 3/2014 |
| | | | | 345/83 |
| 2003/0179933 | A1 * | 9/2003 | Kato | G10L 17/20 |
| | | | | 382/190 |
| 2004/0228544 | A1 * | 11/2004 | Endo | G06T 15/205 |
| | | | | 382/284 |
| 2008/0137946 | A1 * | 6/2008 | Choe | G06T 5/70 |
| | | | | 348/E9.053 |
| 2011/0109661 | A1 * | 5/2011 | Lee | G09G 3/20 |
| | | | | 345/690 |
| 2011/0148906 | A1 * | 6/2011 | Jeong | G09G 3/2007 |
| | | | | 345/589 |
| 2016/0275660 | A1 * | 9/2016 | Yamamoto | G06T 5/90 |
| 2017/0294000 | A1 * | 10/2017 | Shen | G06F 3/0482 |
| 2018/0061020 | A1 * | 3/2018 | Hiasa | G06T 3/60 |

| | | | | |
|---|---|---|---|---|
| 2020/0412932 | A1 * | 12/2020 | Naruse | G05B 19/41875 |
| 2021/0012462 | A1 * | 1/2021 | Kim | G06T 5/60 |
| 2021/0035341 | A1 * | 2/2021 | Lee | G06T 7/30 |
| 2021/0104032 | A1 * | 4/2021 | Noda | E01D 22/00 |
| 2021/0248728 | A1 * | 8/2021 | Hu | G06T 5/60 |
| 2021/0360179 | A1 * | 11/2021 | Dangi | G06T 1/20 |
| 2022/0292814 | A1 * | 9/2022 | Watanabe | G06T 7/0004 |
| 2023/0334882 | A1 * | 10/2023 | Kim | G06V 20/698 |
| 2024/0046609 | A1 * | 2/2024 | Miyamoto | G06V 10/774 |
| 2024/0161254 | A1 * | 5/2024 | Shibayama | G06V 10/82 |
| 2024/0331590 | A1 * | 10/2024 | Kuang | G09G 5/02 |
| 2025/0037485 | A1 * | 1/2025 | Kappel | G06V 20/698 |
| 2025/0193358 | A1 * | 6/2025 | Lee | G06N 3/045 |

FOREIGN PATENT DOCUMENTS

| | | |
|---|---|---|
| JP | 2016048910 A | 4/2016 |
| JP | 2019125116 A | 7/2019 |
| JP | 2019219147 A | 12/2019 |

* cited by examiner

INFORMATION PROCESSING APPARATUS, INFORMATION PROCESSING METHOD, AND PROGRAM

CROSS-REFERENCE TO RELATED APPLICATIONS

The present Application for Patent is a National Stage Entry of International Application No. PCT/JP2022/004650, filed Feb. 7, 2022, which claims priority to Japanese Patent Application No. 2021-060383, filed Mar. 31, 2021. The disclosure of the priority documents are incorporated in its entirety by reference herein.

TECHNICAL FIELD

The present disclosure relates to an information processing apparatus, an information processing method, and a program.

BACKGROUND ART

In association with the development in technology regarding image analysis and various kinds of recognitions, it is becoming possible to detect and identify various kinds of objects that are captured as a subject in an image, and various kinds of examinations regarding the application of such so-called image recognition technique are being performed. For example, Patent Literature 1 proposes a technique of applying the image recognition technique to so-called remote monitoring in which a desired target is monitored from a remote location using an image-capturing device, such as a security camera, and thereby allowing an occurrence of abnormality to be detected without a user confirming an image based on visual observation.

Furthermore, recently, a technique that applies a learned model constructed based on machine learning to image recognition is also being examined. For example, Patent Literature 2 discloses an example of a technique that uses a learned model based on a machine learning for monitoring a monitoring target using images corresponding to captured results of a security camera.

CITATION LIST

Patent Literature

Patent Literature 1: Japanese Laid-open Patent Publication No. 2016-48910
Patent Literature 2: Japanese Laid-open Patent Publication No. 2019-219147

SUMMARY OF INVENTION

Technical Problem

Meanwhile, in an image obtained by capturing a desired target using an image-capturing device or the like, not only a change in the target, but also changes due to other factors, such as a change in a lighting environment and the like, might possibly occur. In such way, in data used for processes regarding various kinds of recognitions and detections, not only a change as the target of the recognition and the detection, but also changes due to a variety of factors appear in some cases. Under such circumstances, for example, in a case like monitoring a desired target using an analysis result of desired data (such as an image corresponding to a captured result), it is sometimes difficult to judge whether a change having appeared in the data is a change due to an abnormality having occurred in the monitoring target, or a change that can occur even in a normal state.

In view of the above-described problems, the present invention has an object to allow detecting an appearance of a desired change in a more preferred manner even under circumstances where various kinds of changes can appear in a target image.

Solution to Problem

An information processing apparatus according to the present invention includes a generator, a determiner, and an outputter. The generator is configured to generate a normalized image by performing a normalization process using a learned model constructed in advance based on a machine learning with a plurality of normal images as input, on an input image. The determiner is configured to determine whether the normalized image and a prescribed reference image approximately match or not. The outputter is configured to output notification information according to a result of the determination to a prescribed output destination.

Advantageous Effects of Invention

According to the present invention, an appearance of a desired change can be detected in a more preferred manner even under circumstances where various kinds of changes can appear in a target image.

DESCRIPTION OF EMBODIMENTS

Figure 1:
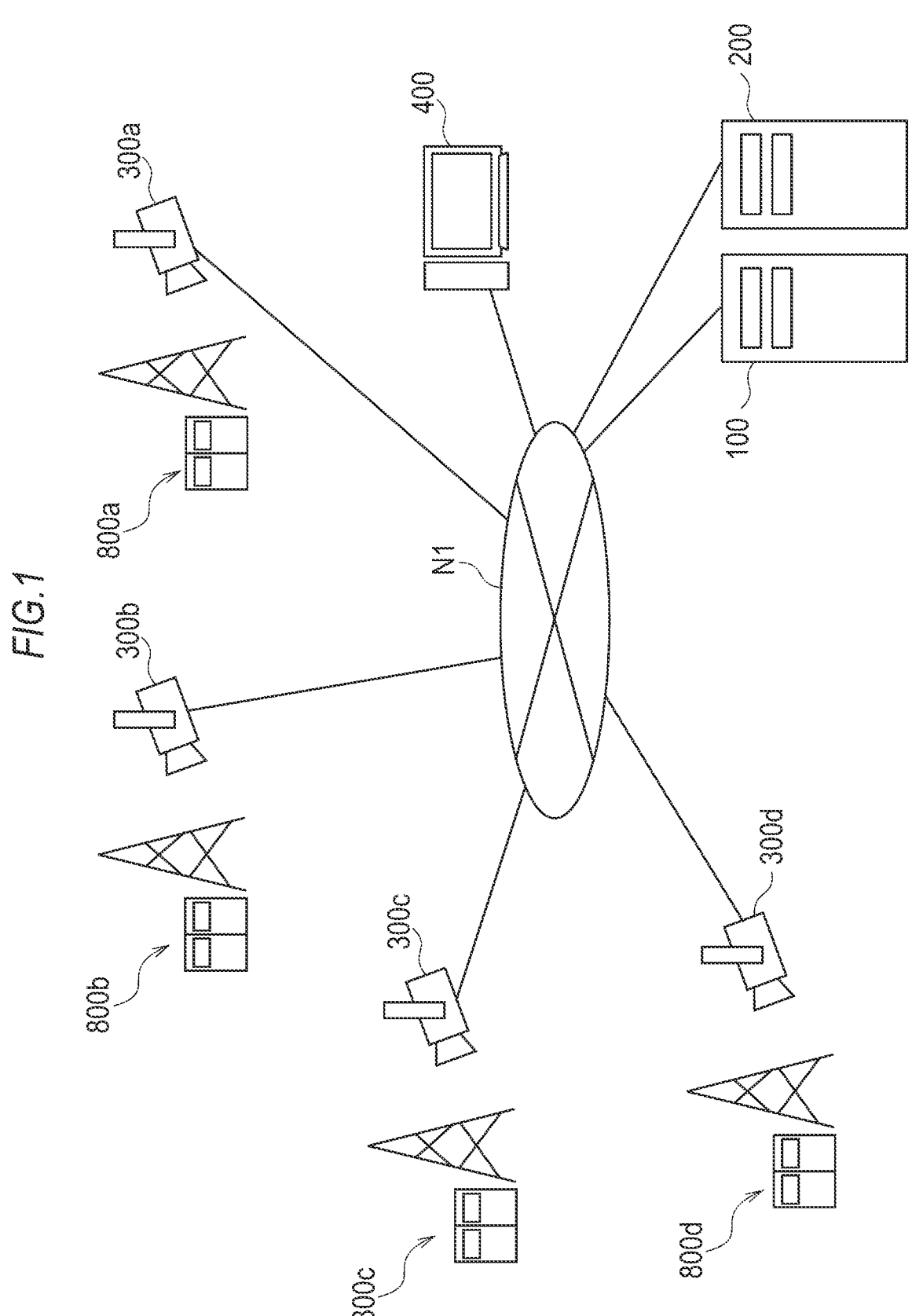
FIG. 1 is a diagram indicating an example of a system configuration of an information processing system.

The following describes preferred embodiments of the present disclosure in detail with reference to the accompanying drawings. Note that, in the present specification and drawings, same reference numerals are attached to components having substantially the same functional configurations to omit overlapping descriptions.

<System Configuration>

With reference to FIG. 1, an example of a system configuration of an information processing system according to the present embodiment will be described. The information processing system according to the present embodiment provides a mechanism that uses an image-capturing device (such as a video camera or the like) connected to a network to allow monitoring the state of a monitoring target (such as various kinds of facilities or the like) installed in a remote location. For example, FIG. 1 indicates an example of a configuration of an information processing system 1 in a case of monitoring states of respective facilities 800a to 800d installed in remote locations based on images corresponding to captured results of respective image-capturing devices 300a to 300d. Specifically, the information processing system 1 includes image-capturing devices 300a to 300d, information processing apparatuses 100 and 200, and a terminal device 400. Note that, in the following, the respective image-capturing devices 300a to 300d are sometimes referred to as an "image-capturing device 300" when they are not particularly distinguished. Similarly, the respective facilities 800a to 800d are sometimes referred to as a "facility 800" when they are not particularly distinguished. The respective image-capturing devices 300a to 300d, the respective information processing apparatuses 100 and 200, and the terminal device 400 are configured to allow transmitting and receiving various kinds of information and data via a network N1.

The type of the network N1 that connects the respective devices constituting the information processing system 1 is not particularly limited. As a specific example, the network N1 may be constituted of a Local Area Network (LAN), the Internet, a leased line, or a Wide Area Network (WAN), or the like. The network N1 may be constituted of a wired network, or may be constituted of a wireless network. The network N1 may include a plurality of networks, and a network of a type that is different from that of other networks may be included as a part of the networks. It is sufficient that communication between the respective devices is logically established, and a physical configuration of the network N1 is not specifically limited. As a specific example, the communication between the respective devices may be relayed by another communication device or the like. In addition, the series of devices constituting the information processing system 1 need not be necessarily connected to a common network. That is, as long as a communication between devices that transmit and receive information and data can be established, mutually different networks may connect between two or more devices and between other two or more devices.

The image-capturing device 300 can be achieved by an image-capturing device, such as a so-called digital camcorder (such as a security camera or the like), that is configured to be capable of capturing images, such as a moving image or a still image. The image-capturing device 300 transmits data of image (hereinafter also referred to as "image data") corresponding to the captured results to other devices (such as the information processing apparatuses 100 and 200 or the like) via the network N1.

The information processing apparatuses 100 and 200 provide a mechanism that allows monitoring a state of the facility 800 based on the image data corresponding to the captured result of the facility 800 by the image-capturing device 300 transmitted from the image-capturing device 300.

Specifically, the information processing apparatus 200 performs a prescribed analysis process on an image corresponding to image data transmitted from the image-capturing device 300, and thereby detects an occurrence of abnormality when the abnormality occurs in the state of the facility 800 captured as the subject. At this time, the information processing apparatus 200 outputs notification information according to a result of the detection to a prescribed output destination (such as the terminal device 400 described later). Accordingly, when an abnormality occurs in the facility 800, a user (such as an administrator) can be notified of the occurrence of abnormality.

The information processing apparatus 100 constructs a learned model that the information processing apparatus 200 uses for the above-described analysis process based on a machine learning. As a specific example, the information processing apparatus 100 may use a so-called neural network referred to as a Generative Adversarial Network (GAN) to construct the above-described learned model.

Note that details of the configurations and processes of the information processing apparatuses 100 and 200 will be additionally described later.

The terminal device 400 schematically indicates a terminal device used by the user to manage the respective information processing apparatuses 100 and 200, and the respective image-capturing devices 300. As a specific example, the terminal device 400 plays a role as an input interface that accepts input regarding the management of the respective information processing apparatuses 100 and 200 and the respective image-capturing devices 300, and a role as an output interface regarding output of various kinds of information to the user.

Note that the configuration indicated in FIG. 1 is merely an example, and as long as functions of the respective components in the information processing system 1 additionally described later can be achieved, the system configuration of the information processing system 1 is not necessarily limited. As a specific example, two or more devices among the information processing apparatus 100, the information processing apparatus 200, and the terminal device 400 may be integrally configured. Also, as another example, the function of at least one device among the information processing apparatus 100, the information processing apparatus 200, and the terminal device 400 may be achieved by a plurality of the devices operating in collaboration.

<Hardware Configuration>

Figure 2:
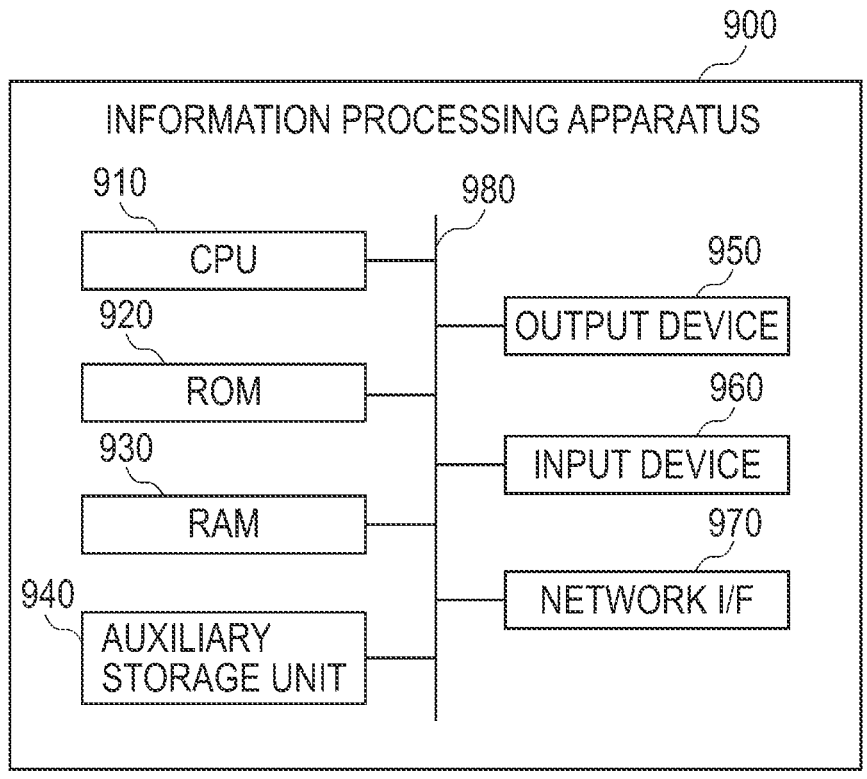
FIG. 2 is a diagram indicating an example of a hardware configuration of an information processing apparatus.

With reference to FIG. 2, an example of a hardware configuration of an information processing apparatus 900 that is applicable as the respective information processing apparatuses 100 and 200 and as the terminal device 400 in the information processing system 1 according to the present embodiment will be described. As indicated in FIG. 2, the information processing apparatus 900 according to the present embodiment includes a Central Processing Unit (CPU) 910, a Read Only Memory (ROM) 920, and a Random Access Memory (RAM) 930. In addition, the information processing apparatus 900 includes an auxiliary storage unit 940 and a network I/F 970. Moreover, the information processing apparatus 900 may include at least either of an output device 950 and an input device 960. The CPU 910, the ROM 920, the RAM 930, the auxiliary storage unit 940, the output device 950, the input device 960, and the network I/F 970 are mutually connected via a bus 980.

The CPU 910 is a central processing unit that controls various kinds of operations of the information processing apparatus 900. For example, the CPU 910 may control the operation of the entire information processing apparatus 900. The ROM 920 stores, for example, a control program and a boot program that are executable by the CPU 910. The RAM 930 is a main storage memory of the CPU 910, and is used as a work area or a temporary storage area for deploying various kinds of programs.

The auxiliary storage unit 940 stores various kinds of data and various kinds of programs. The auxiliary storage unit 940 is achieved by a storage device that can temporarily or sustainably store various kinds of data, such as a nonvolatile memory typified by a Hard Disk Drive (HDD) or a Solid State Drive (SSD).

The output device 950 is a device that outputs various kinds of information, and is used for presenting various kinds of information to the user. In the present embodiment, the output device 950 is achieved by a display device, such as a display. The output device 950 presents information to the user by displaying various kinds of display information. However, as another example, the output device 950 may be achieved by an acoustic output device that outputs a sound, such as a voice or an electronic sound. In this case, the output device 950 presents information to the user by outputting the sound, such as a voice or a an electronic sound. The device applied as the output device 950 may be appropriately changed according to a medium used for presenting information to the user.

The input device 960 is used for accepting various kinds of instructions from the user. In the present embodiment, the input device 960 includes input devices, such as a mouse, a keyboard, and a touch panel. However, as another example, the input device 960 may include a sound collecting device, such as a microphone, to collect voices uttered by the user. In this case, by performing various kinds of analysis processes, such as an acoustic analysis or a natural language process, on the collected voices, a content indicated by these voices is recognized as an instruction from the user. Also, the device applied as the input device 960 may be appropriately changed according to a method for recognizing the instruction from the user. A plurality of types of devices may be applied as the input device 960.

The network I/F 970 is used for communication with an external device via a network. Note that the device applied as the network I/F 970 may be appropriately changed according to the type of communication path or an applied communication style.

The CPU 910 deploys a program stored in the ROM 220 or the auxiliary storage unit 940 in the RAM 930 and executes this program, and thereby, the functional configurations of the respective information processing apparatuses 100 and 200 indicated in FIG. 3 and the processes of the respective information processing apparatuses 100 and 200 described with reference to FIG. 4, FIG. 6, FIG. 7, and the like are achieved.

<Functional Configuration>

Figure 3:
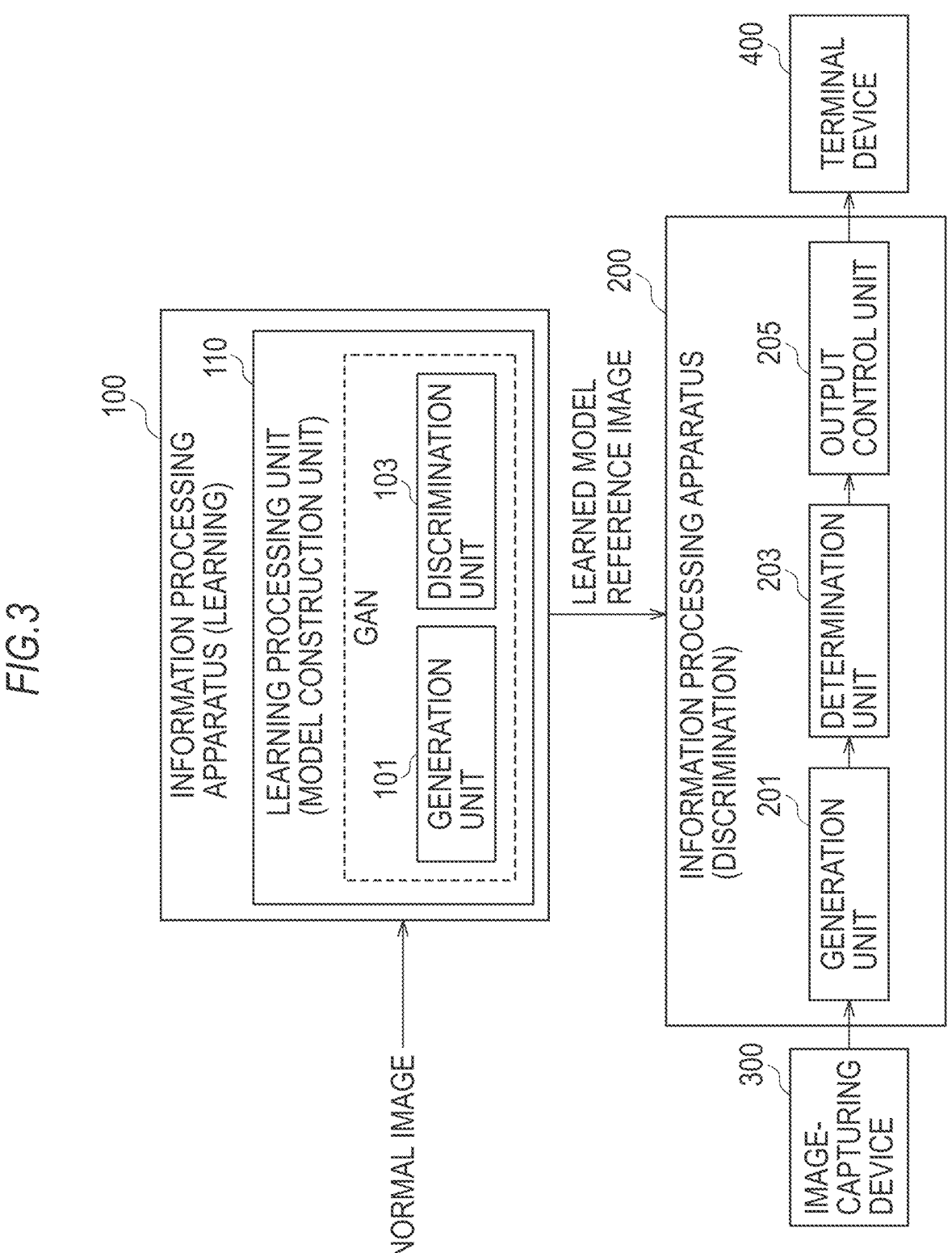
FIG. 3 is a block diagram indicating an example of a functional configuration of the information processing system.

With reference to FIG. 3, an example of the functional configuration of the information processing system 1 according to the present embodiment will be described by particularly focusing on the configurations of the respective information processing apparatuses 100 and 200.

First, an example of the functional configuration of the information processing apparatus 100 will be described. As described above, the information processing apparatus 100 constructs a learned model to be used by the information processing apparatus 200 described later for performing a prescribed analysis process on an image corresponding to image data transmitted from the image-capturing device 300 based on the machine learning. A learning processing unit 110 schematically indicates a component that executes various kinds of processes regarding the construction of the learned model. That is, the learning processing unit 110 is equivalent to an example of a "construction unit" regarding the construction of the learned model.

The learning processing unit 110 constructs the above-described learned model based on the machine learning with a plurality of images that indicate a proper state (hereinafter the image will also be referred to as a "normal image") as input. Here, the learning processing unit 110 may construct the above-described learned model so as to perform, with any of the plurality of normal images as a reference image, an image process of making features of other normal images other than the reference image closer to features of the reference image on the other normal images. Note that, in the following description, the image process is also referred to as a "normalization process," and an image generated by performing the normalization process on a target image is also referred to as a "normalized image."

For example, the learning processing unit 110 may construct the learned model based on a machine learning using a neural network referred to as GAN. In this case, the learning processing unit 110 may include a generation unit 101 (Generator) and a discrimination unit 103 (Discriminator). Note that, details of the mechanism regarding the construction of the learned model using the generation unit 101 and the discrimination unit 103, and the content of a normalization process performed by the information processing apparatus 200 on an inputted image using the learned model will be additionally described later.

The above-described learned model constructed based on the machine learning is outputted to the information processing apparatus 200. Note that, as long as the information processing apparatus 200 can obtain the above-described learned model, the method thereof is not particularly limited. As a specific example, the information processing apparatus 100 may transmit the learned model to the information processing apparatus 200 via the network N1. Also, as another example, the information processing apparatus 100 may store the constructed learned model in a desired storage area. In this case, the information processing apparatus 200 may read out the learned model from the storage area to obtain the learned model.

The reference image used for the construction of the above-described learned model may be outputted to the information processing apparatus 200 together with the learned model.

Next, an example of the functional configuration of the information processing apparatus 200 will be described. The information processing apparatus 200 includes a generation unit 201, a determination unit 203, and an output control unit 205.

The generation unit 201 obtains image data corresponding to a captured result of the facility 800 as the monitoring target by the image-capturing device 300 from the image-capturing device 300. The generation unit 201 performs, on an image corresponding to the obtained image data, the normalization process using the learned model obtained from the information processing apparatus 100 and thereby generates the normalized image. Accordingly, the normalized image is generated by performing, on the image corresponding to the captured result of the image-capturing device 300, the normalization process of making features of the image closer to the features of the reference image.

The determination unit 203 determines whether the normalized image generated by the generation unit 201 and the above-described reference image approximately match or not. Here, the determination unit 203 may compare the normalized image and the reference image by the pixel unit and determine whether these images approximately match or not. As a specific example, the determination unit 203 may use a sum of absolute difference (SAD) of the pixel values of the respective pixels to compare the normalized image and the reference image.

Moreover, here, the determination unit 203 may compare the normalized image and the reference image by the pixel unit for each component (such as the RGB) constituting the pixel to determine whether the normalized image and the reference image approximately match or not. More specifically, by first obtaining an absolute difference of each component value (such as the RGB) of an element of the respective pixels between the normalized image and the reference image, it may be determined whether the target pixels approximately match or not according to whether an average of the absolute differences obtained for the respective component values exceeds a threshold value or not. Upon that, based on the number of pixels that approximately match between the normalized image and the reference image, it may be determined whether the normalized image and the reference image approximately match or not.

Note that, as the "component value of an element," various calculated values with nearby pixels, such as an average value of nearby pixels or differences between nearby pixels can be applied. A more specific example of such calculated value includes features that emphasize edges, such as a HOG feature, SIFT feature, and a SURF feature.

Here, when the difference between features of an image as a generation source of the above-described normalized image and the features of the reference image is within a range that is reproducible according to features of the respective plurality of normal images used for the construction of the above-described learned model, the normalized image and the above-described reference image approximately match in the above-described comparison. Meanwhile, in a case where a feature that is difficult to be analogized from the features of the above-described respective plurality of normal images appear in the image as the generation source of the above-described normalized image, the normalized image and the above-described reference image sometimes do not approximately match in the above-described comparison. Therefore, in a case where a change in state that cannot be anticipated at a normal time occurs as a change in state of the facility 800 as the monitoring target, the above-described normalized image and the above-described reference image do not approximately match, and thereby the occurrence of the change can be detected. Note that details of the mechanism regarding the detection of abnormality having occurred in the monitoring target described above (such as the facility 800) will be additionally described later with specific examples.

The determination unit 203 outputs information according to a result of the above-described determination to the output control unit 205.

The output control unit 205 outputs information according to the result of the above-described determination by the determination unit 203 to a prescribed output destination. For example, the output control unit 205 may output notification information according to the result of the above-described determination by the determination unit 203 to the terminal device 400. Accordingly, the notification information according to the result of the above-described determination by the determination unit 203 can be notified to the user via the terminal device 400. Also, as another example, the output control unit 205 may cause the information according to the result of the above-described determination by the determination unit 203 to be stored in a prescribed storage area.

Note that, the above description is merely an example, and as long as functions equivalent to the respective components (especially the components of the respective information processing apparatuses 100 and 200) of the information processing system 1 described above can be achieved, the functional configurations of the information processing system 1 are not limited. For example, the functional configurations of the respective information processing apparatuses 100 and 200 may be achieved by a plurality of devices operating in collaboration.

As a specific example, a part of components among the series of components of the information processing apparatus 100 may be disposed in another device different from the information processing apparatus 100. Also, as another example, a load regarding a process of at least a part of components among the series of components of the information processing apparatus 100 may be dispersed in a plurality of devices. These also apply similarly to the information processing apparatus 200.

<Technical Feature>

Subsequently, as technical features of the information processing system 1 according to the present embodiment, features regarding the construction of the learned model by the information processing apparatus 100 and features regarding the detection of abnormality of the monitoring target by the information processing apparatus 200 will each be described in detail in the following.

First, with reference to FIG. 4, a technical idea regarding the information processing system 1 according to the present embodiment will be described. Note that, in the following, in order to facilitate understanding of the technical features of the information processing system 1 according to the present embodiment, the respective descriptions will be given under the assumption that the GAN is used for the construction of the learned model.

Figure 4:
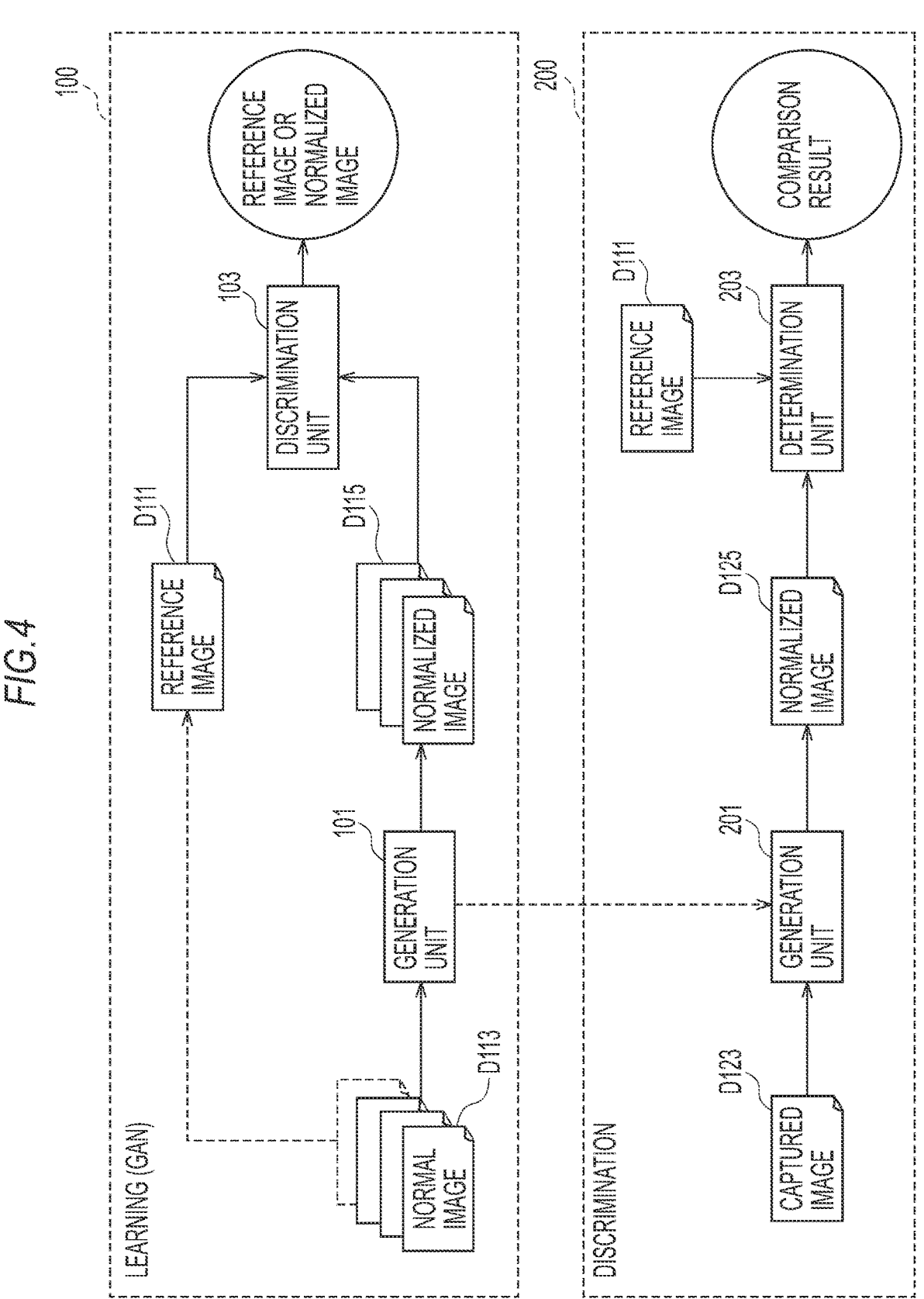
FIG. 4 is a diagram for describing a technical idea regarding the achievement of the information processing system.

In FIG. 4, a combination of the generation unit 101 and the discrimination unit 103 constitutes the generative adversarial network (GAN). In addition, the construction of the learned model uses a plurality of normal images D113 having mutually different conditions regarding image capturing (for example, a condition regarding a capturing environment, such as a lightening condition, and the like) is mutually different. Specifically, with any of the plurality of normal images D113 as a reference image D111, other normal images D113 other than the reference image D111 are inputted to the generation unit 101.

The generation unit 101 performs, on the inputted normal image D113, the normalization process of making features of the normal image D113 closer to features of the reference image D111 by the learned model and thereby generates the normalized image D115.

Either the reference image D111 or the normalized image D115 generated by the generation unit 101 is inputted to the discrimination unit 103, and the discrimination unit 103 judges whether the image is the reference image D111 or the normalized image D115.

Based on such configuration, the generation unit 101 uses the GAN in the combination with the discrimination unit 103, and constructs the above-described learned model such that the normalization process that makes a discrimination between the normalized image D115 and the reference image D111 more difficult for the discrimination unit 103 is performed on the normal image D113.

As above, the generation unit 101 constructs the above-described learned model individually for each monitoring target, and associates the learned model with the reference image D111 (image in which the monitoring target is captured as the subject) that is used at the time of constructing the learned model.

The learned model constructed by the generation unit 101 is applied to the normalization process on an input image by the generation unit 201 of the information processing apparatus 200. Specifically, the generation unit 201 performs, on a captured image D123 corresponding to a captured result of the image-capturing device 300, a normalization process of making features of the captured image D123 closer to the features of the reference image D111 using the above-described learned model and thereby generates a normalized image D125.

Here, when the difference between the captured image D123 and the reference image D111 is a difference that can be analogized based on features of the respective plurality of normal images D113 used in the construction of the learned model, the normalized image D125 in which the difference has been eliminated can be generated. That is, in this case, the determination unit 203 outputs a determination result that the normalized image D125 and the reference image D111 approximately match.

In contrast to this, when the difference between the captured image D123 and the reference image D111 is a difference that is difficult to be analogized based on the features of the respective plurality of normal images D113 used in the construction of the learned model, it becomes difficult to eliminate this difference when generating the normalized image D125. That is, in this case, the determination unit 203 outputs a determination result that the normalized image D125 and the reference image D111 do not approximately match.

With such characteristics, for example, even in a case where a change appears in an image corresponding to the captured result of the facility 800 as the monitoring target, when it is a change that can appear even when the facility 800 is in a normal state, the facility 800 is determined to be normal. Upon that, in a case where a change that cannot appear in a normal state appears in the image corresponding to the captured result of the facility 800 as the monitoring target, the occurrence of this change can be detected as an abnormality. With such configuration, even when a change that can be anticipated when the monitoring target is in a normal state occurs, it is possible to avoid a situation where the occurrence of the change is detected as an abnormality, and when a change that is outside the range of anticipation has occurred, the occurrence of the change can be detected as an abnormality. That is, with the information processing system according to the present embodiment, an appearance of a desired change can be detected in a more preferred manner even under circumstances where various kinds of changes can appear in a target image.

(Construction of Learned Model)

Next, with reference to FIG. 5 and FIG. 6, the mechanism regarding the construction of the learned model used for generating the normalized image by performing the normalization process on an input image will be described by particularly focusing on a case of using the GAN.

A method of machine learning that is generally used include a method referred to as so-called supervised learning in which a target model is provided with learning data together with a correct label for the data at the time of learning, and thereby the model is constructed so as to make a predicted value closer to the correct label. By using the supervised learning, for example, and thereby using an image to which a normal state and an abnormal state have both been labeled at the time of learning, it is also possible to construct the learned model so as to classify whether the input image indicates a normal state or an abnormal state at the time of discrimination.

However, in a case of using the learned model constructed based on a general machine learning for detecting an abnormality having occurred in the monitoring target, data indicating an abnormal state is sometimes necessary in addition to data indicating a normal state at the time of learning. In terms of this, it is sometimes difficult to prepare data indicating an abnormal state (in other words, incorrect data) at the time of learning. For example, as the example indicated in FIG. 1, under circumstances where the learned model for achieving the monitoring of the facility 800 is constructed for each facility 800 as the monitoring target, it is sometimes difficult to prepare a series of images indicating that the facility 800 is an abnormal state.

In view of such circumstance, the information processing system according to the present embodiment applies a machine learning that uses normal images indicating a normal state of the monitoring target to construct the learned model.

Meanwhile, regarding the image corresponding to the captured result of the monitoring target, circumstances where the image changes now and then due to a difference in the lighting environment and the like can be anticipated. When such circumstances are anticipated, by simply applying a machine learning that uses normal images, in some cases, the respective images are classified as images indicating mutually different states, and as a result, it is difficult to judge whether the monitoring target is normal or not.

Therefore, the present embodiment proposes a technique that has a robustness that allows determining a normal state of the monitoring target when a change having appeared in inputted data (such as an image corresponding to a captured result of the monitoring target) is within an admissible range, and is able to detect an abnormal state of the monitoring target when a change outside the admissible range has appeared. Specifically, in the information processing system according to the present embodiment, by using the neural network referred to as GAN, as described above, a learned model for achieving a detection of abnormality having appeared in inputted data without using an abnormal image indicating an abnormal state of the monitoring target is constructed.

By applying such mechanism, the information processing system according to the present embodiment can construct a learned model that can be used for a detection of abnormality of a monitoring target by using normal images without using an abnormal image.

Note that, in the following, in order to facilitate understanding of the features of the information processing system according to the present embodiment, a description will be given of the mechanism regarding the construction of the learned model by focusing on a case where images are used as learning data.

First, with reference to FIG. 5, an example of images (normal images) used for the construction of the learned model will be described. As described above, in the information processing system according to the present embodiment, when constructing the learned model, a plurality of the normal images D113 having mutually different conditions regarding image capturing are used.

Figure 5:
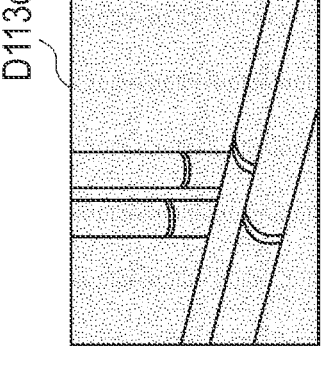
FIG. 5 is a diagram indicating an example of normal images used for the construction of a learned model.
Figure 5:
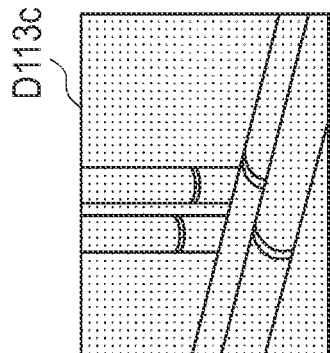
Figure 5:
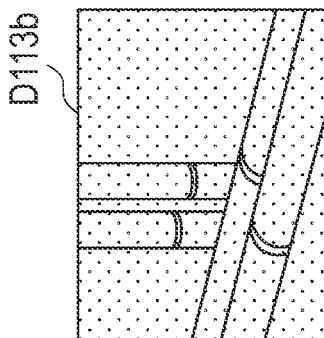
Figure 5:
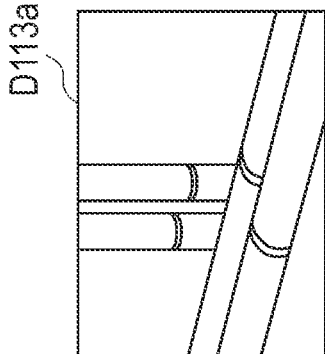

For example, the normal images D113a to D113d indicated in FIG. 5 indicate examples of images corresponding to a captured result of the facility 800 as the monitoring target in states having mutually different conditions of the lighting environment. Specifically, in the example illustrated in FIG. 5, although the facility 800 as the monitoring target is in a normal state, the condition of the lighting environment changes now and then due to a sunshine condition and the like changing with the passage of time, and as a result, images having mutually different brightness and chromaticity are obtained.

In addition, as long as it is an image corresponding to the captured result of the facility 800 in a normal state, not limited to the example indicated in FIG. 5, any image corresponding to changes of various kinds of conditions may be applied as the normal image.

As a specific example, in accordance with the passage of time and changes in weather (such as rain and wind), the capturing environment and the state of the image-capturing device changes. As a result, a change in the brightness, chromaticity, shape of shadow due to sunshine, presence/absence of water droplets attached on a lens, slight displacement of the image-capturing device, and the like occurs, and the change sometimes appears in the image corresponding to the captured result. Such image may also be applied as the normal image as long as it is an image corresponding to a result of the target facility being captured in a normal state.

Next, with reference to FIG. 6, an example of the mechanism regarding the construction of the learned model will be described by focusing on a case where the learned model is constructed using the series of normal images D113 indicated in FIG. 5. Note that, in the example indicated in FIG. 6, for convenience, among the normal images D113a to D113d indicated in FIG. 5, the normal image D113a is used as the reference image D111. That is, the reference image D111 and the normal image D113 (the normal images D113b to D113d) indicated in FIG. 6 are equivalent to the reference image D111 and the normal image D113 indicated in FIG. 4.

Specifically, among the normal images D113a to D113d, other normal images D113b to D113d other than the normal image D113a used as the reference image D111 are inputted to the generation unit 101. The generation unit 101 performs, on the inputted normal image D113 (the respective normal images D113b to D113d), the normalization process of making features of the normal image D113 closer to features of the reference image D111 (the normal image D113a) and thereby generates the normalized image D115. As a specific example, in the example indicated in FIG. 6, the brightness and chromaticity of the normal image D113 inputted to the generation unit 101 have been adjusted, and thereby the normalized image D115 having features resembling those of the reference image D111 is generated.

The reference image D111 and the normalized image D115 generated by the generation unit 101 are both inputted to the discrimination unit 103. The discrimination unit 103 judges whether the inputted image is the reference image D111 or the normalized image D115.

As described above, the combination of the generation unit 101 and the discrimination unit 103 constitutes the GAN. Based on such configuration, the generation unit 101 constructs the learned model regarding the application of the normalization process on an input image so as to perform, on the inputted normal image D113, the normalization process that makes a discrimination between the reference image D111 and the normalized image D115 more difficult for the discrimination unit 103. Also, the discrimination unit 103 further improves accuracy regarding the discrimination between the reference image D111 and the normalized image D115 such that the reference image D111 and the normalized image D115 can be discriminated more accurately.

With the configuration as above, it is possible to construct the above-described learned model that can accurately generate the normalized image D115 having features that more closely resemble those of the reference image D111 based on an input image when the difference between the input image and the above-described reference image D111 is in a range that can be analogized based on the differences in features between the normal images D113a to D113d.

The constructed above-described learned model and the reference image D111 used for the construction of the learned model are used for the monitoring of the facility 800 as the monitoring target (in other words, detection of abnormality having occurred in the facility 800) by the information processing apparatus 200.

Note that, while an example of a case where the data used for the construction of the learned model is data of image has been described above, the type of the data is not necessarily limited, and data of other types may be used. As a specific example, acoustic data, such as a voice, a musical composition, an environmental sound, or the like may be used for the construction of the learned model. In this case, the learned model is constructed so as to perform, on the inputted acoustic data, a normalization process of making features of the acoustic data closer to features of reference acoustic data.

(Detection of Abnormality)

Next, with reference to FIG. 7 to FIG. 9, a mechanism of detecting an abnormality when the abnormality has occurred in the monitoring target by using the learned model regarding the application of the normalization process on an input image constructed based on the machine learning will be described. Note that, in the following, in order to facilitate understanding of the features of the information processing system according to the present embodiment, a description of the above-described mechanism will be given by focusing on an example of a case where an abnormality having occurred in the monitoring target is detected using the learned model described with reference to FIG. 5 and FIG. 6.

First, with reference to FIG. 7, a mechanism regarding the detection of an abnormality having occurred in the monitoring target will be described. In FIG. 7, D111 is equivalent to the reference image D111 described with reference to FIG. 6. D123 is equivalent to the captured image corresponding to the captured result of the facility 800 as the monitoring target by the image-capturing device 300. That is, the reference image D111 and the captured image D123 indicated in FIG. 7 are equivalent to the reference image D111 and the captured image D123 indicated in FIG. 4. Also, the reference image D111 and the captured image D123 are images based on the captured result of a common facility 800 as the subject.

The generation unit 201 performs, on the inputted captured image D123, the normalization process of making features of the captured image D123 closer to features of the reference image D111 using the learned model constructed in advance based on the machine learning and thereby generates the normalized image D125. Upon that, the determination unit 203 determines whether the generated normalized image D125 and the reference image D111 approximately match or not (for example, whether features of these images approximately match or not).

Here, when it is possible to analogize the features of the captured image D123 and the features of the reference image D111 from the features of the series of respective normal images D113 (such as the normal images D113a to D113d indicated in FIG. 5) used for the construction of the above-described learned model, the features of the generated normalized image D125 approximately match the features of the reference image D111.

Meanwhile, in a case where the captured image D123 includes a difference from the reference image D111 that is difficult to be analogized from the features of the above-described series of respective reference images D111, the features of the generated normalized image D125 do not approximately match the features of the reference image D111. As a specific example, in a case where some kind of abnormality occurs in the facility 800 as the monitoring target and thereby a change that cannot be anticipated when the facility 800 is in a normal state appears in the captured image D123, an influence of the change also appears in the generated normalized image D125. Therefore, in this case, the generated normalized image D125 and the reference image D111 do not approximately match.

Figure 8:
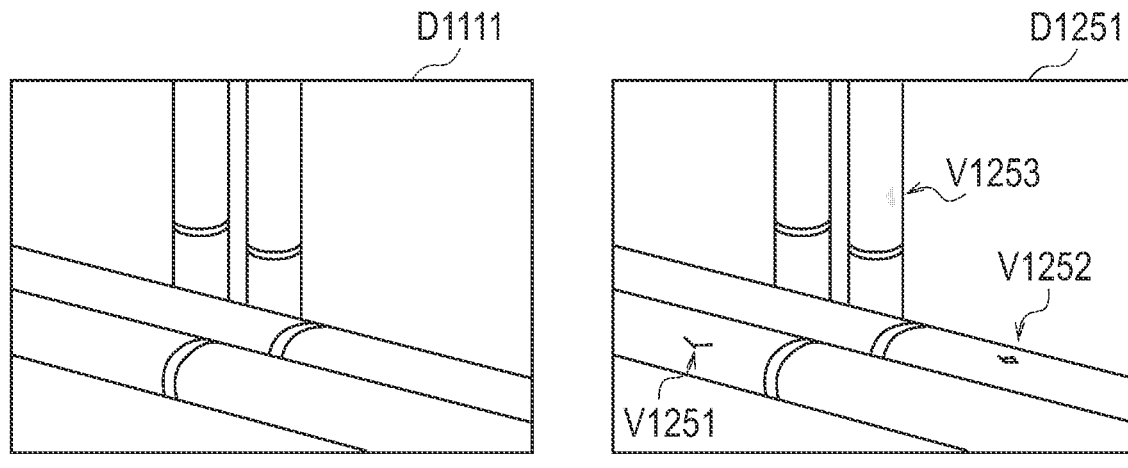
FIG. 8 is a diagram indicating an example of a detected abnormality.

Here, with reference to FIG. 8, an example of an abnormality detected by a comparison between the normalized image D125 and the reference image D111 is described by giving a specific example. D1111 indicates an example of the reference image D111. D1251 indicates an example of the normalized image D125 generated by performing, on the captured image D123, a normalization process of making the features of the captured image D123 closer to the features of the reference image D1111 using the learned model constructed based on the machine learning.

Specifically, the normalized image D1251 indicates an example of the normalized image D125 that is generated when an abnormality has occurred in the facility 800 as the monitoring target. Note that, as the learned model, similarly to the example described with reference to FIG. 7, the learned model described with reference to FIG. 5 and FIG. 6 is applied.

In the normalized image D1251, differences V1251, V1252, and V1253 that are not present in the reference image D1111 have appeared. Specifically, the difference V1251 schematically indicates a difference that has appeared due to a breakage, such as a crack, having occurred in a part of the facility 800 as the monitoring target. The difference V1252 schematically indicates a difference that has appeared due to a deformation having occurred in a part of the facility 800. The difference V1253 schematically indicates a difference that has appeared due to a part of the facility 800 being discolored by an oil leakage or the like caused by a partial breakage of the facility 800.

The changes in state, such as the breakage, deformation, discoloration, or the like, of the facility 800, which are respectively the causes of the differences V1251, V1252, and V1253, having appeared, are equivalent to changes in state that cannot be anticipated when the facility 800 is in a normal state. Therefore, it is difficult to analogize changes respectively corresponding to the differences V1251, V1252, and V1253 from the features of the respective normal images D113a to D113d in which only the condition of the lighting environment is different. Under such circumstances, even by performing the normalization process of making the features of the captured image D123 closer to the features of the reference image D1111 on the captured image D123, the differences V1251, V1252, and V1253 appear in the generated normalized image D1251.

By using such features to compare the generated normalized image D1251 with the reference image D1111, and detect the difference (such as the differences V1251, V1252, V1253, or the like), it is possible to detect an occurrence of an abnormality in the facility 800 as the monitoring target.

Moreover, besides the abnormalities exemplified in the above description, for example, an occurrence of a situation that is not anticipated in a normal state, such as an inclination of the monitoring target, a drop off of a part of components, a generation of smoke or the like due to some kind of factor, an oil leakage, a water leakage, a rupture of a part of the components, or an animal, a plant, or the like coming into contact, and the like, can be detected.

Meanwhile, as described above, when the difference between the captured image D123 and the reference image D111 can be analogized from the features of the series of respective normal images D113 (such as the normal images D113a to D113d), the normalized image D125 and the reference image D111 approximately match. Accordingly, even in a case where a change that can be anticipated when the facility 800 is in a normal state appears in the captured image D123, the facility 800 can be detected to be in a normal state.

Based on the above features, with the information processing system according to the present embodiment, while having a robustness that allows determining a normal state of the facility 800 when a change having appeared in the captured image D123 is within an admissible range, it is possible to detect an abnormal state of the facility 800 when a change outside the admissible range has appeared.

Figure 9:
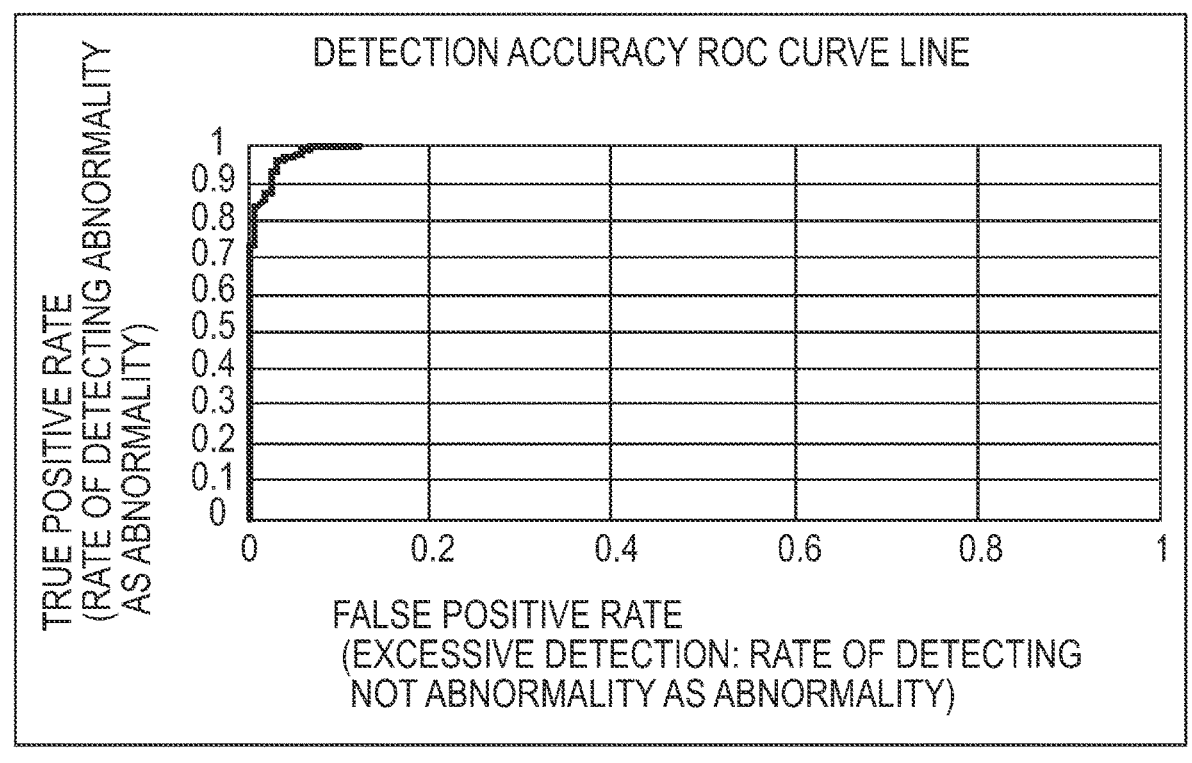
FIG. 9 is a graph indicating an example of an accuracy simulation result regarding a detection of abnormality.

For example, FIG. 9 is a graph indicating an example of an accuracy simulation result regarding the detection of an abnormality having occurred in a monitoring target by the information processing system according to the present embodiment.

Specifically, FIG. 9 indicates an example of a Receiver Operating Characteristic (ROC) curve line in which the vertical axis represents a true positive rate, and the horizontal axis represents a false positive rate, in a case where a threshold value for determining an abnormality by a comparison of images is changed. As indicated in FIG. 9, with the information processing system according to the present embodiment, while further suppressing an occurrence of a so-called excessive detection of detecting a state that should be determined as normal state as abnormal, it is possible to detect an occurrence of abnormality with higher accuracy.

(Supplement)

Note that, the above description is merely an example, and does not limit the application target of the technique according to the present disclosure.

Figure 6:
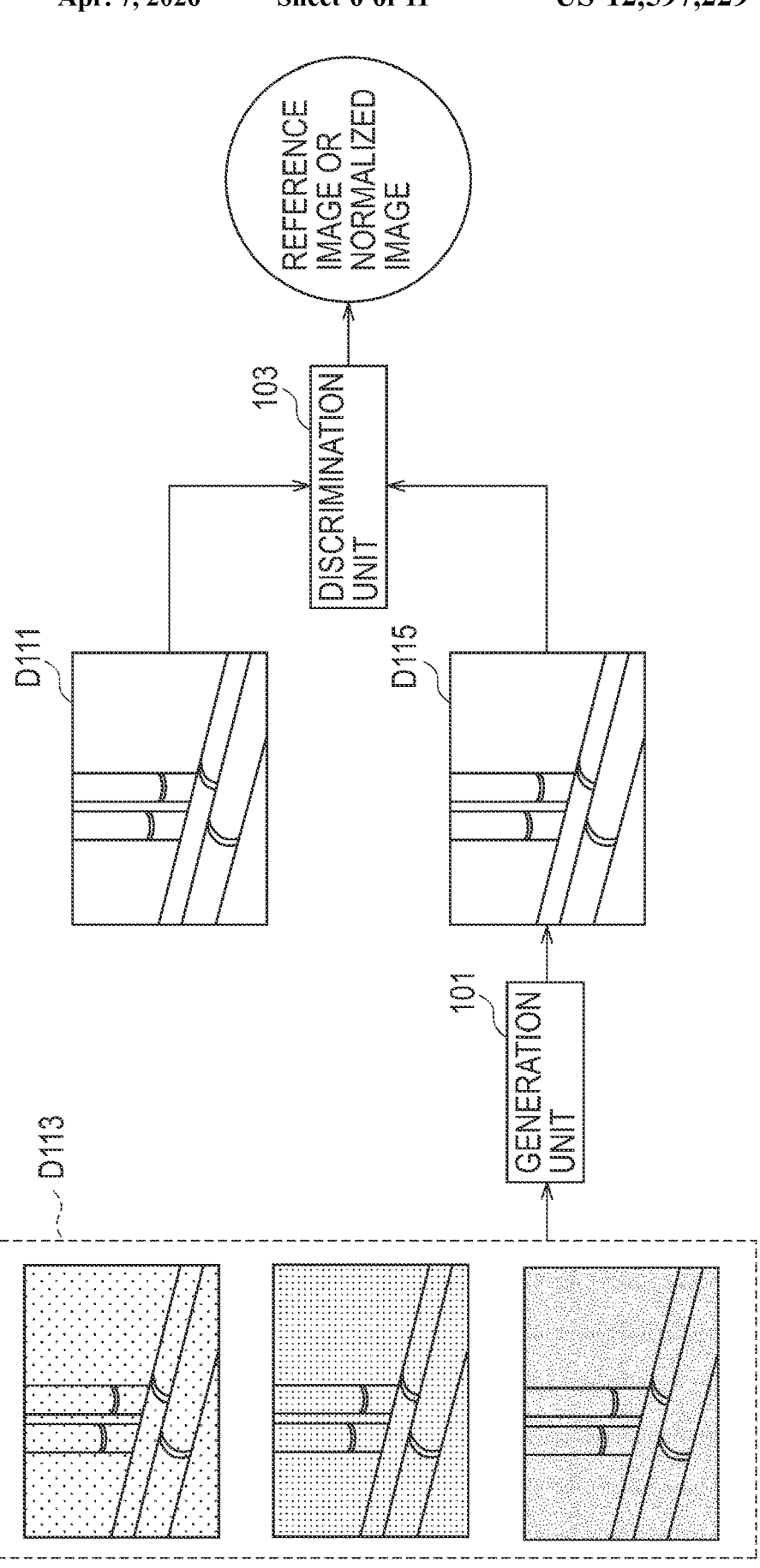
FIG. 6 is a diagram for describing an example of a mechanism regarding the construction of the learned model.
Figure 7:
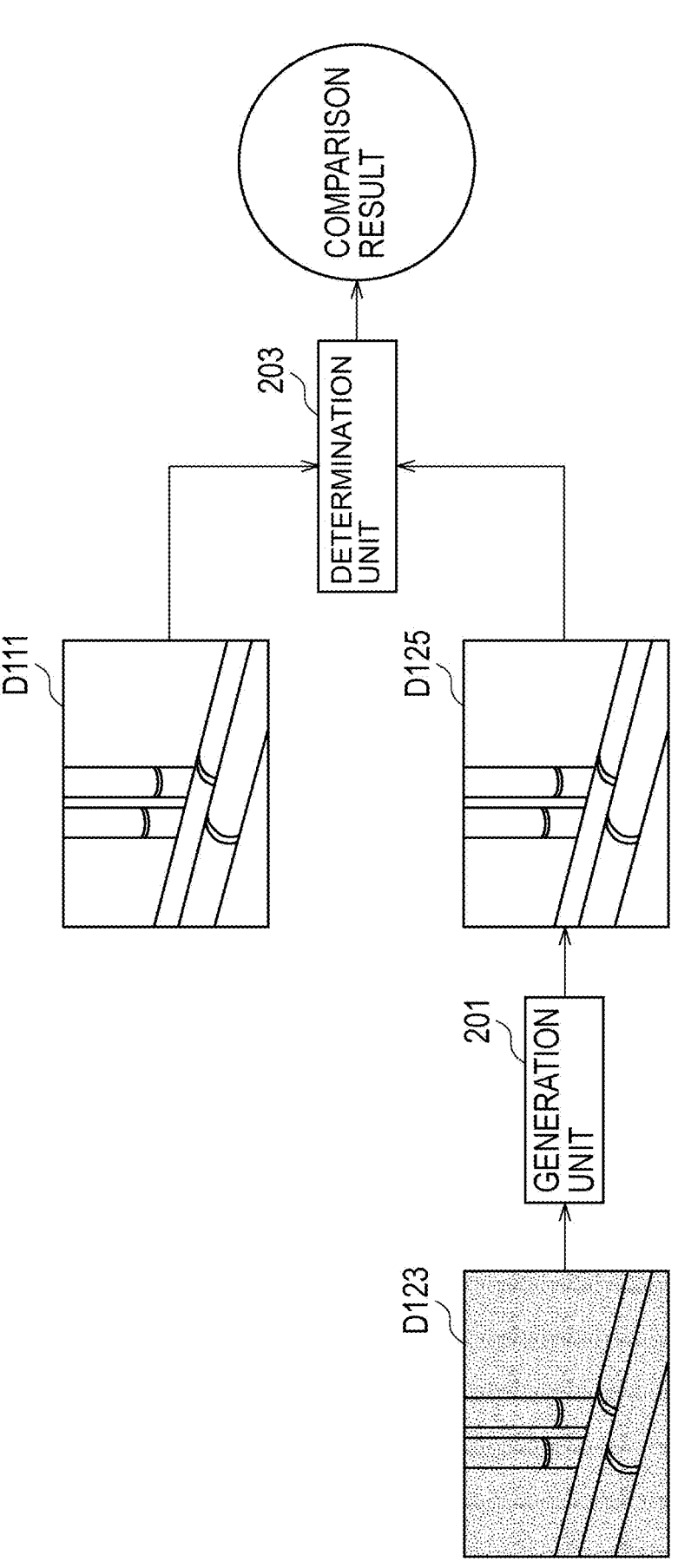
FIG. 7 is a diagram for describing a mechanism regarding a detection of abnormality having occurred in a monitoring target.

For example, the application target of the learned model described with reference to FIG. 5 and FIG. 6 is not necessarily limited only to the system regarding the monitoring of a prescribed target as described with reference to FIG. 7 to FIG. 9. As a specific example, the above-described learned model can be applied under circumstances where, on data having a prescribed format, a process (such as the normalization process) of making features of the data closer to features of reference data having a similar format is applied. The type of data as the application target of the process in this case is, as described above, not limited only to data of image.

Moreover, in the system regarding the monitoring of a prescribed target as described with reference to FIG. 7 to FIG. 9, the learned model used for the normalization process on a captured image is not necessarily limited only to the learned model constructed using the GAN. That is, as long as it is possible to perform, on an inputted captured image, the normalization process of making features of the captured image closer to features of a prescribed reference image, the construction method or the type of the learned model used for the achievement of the normalization process is not particularly limited.

Thus, the technique regarding the construction of the learned model described with reference to FIG. 5 and FIG. 6, and the technique regarding the monitoring of a prescribed target described with reference to FIG. 7 to FIG. 9 can each be independently applied. Moreover, other techniques that are used in combination with the respective techniques are also not particularly limited.

Modification Example

Subsequently, with reference to FIG. 10 and FIG. 11, as a modification example of the information processing system according to the present embodiment, an example of a case where the information processing system according to the present embodiment is applied to an inspection of a reproduction of a so-called mass-produced product or the like will be described. Specifically, the information processing system according to the present modification has a robustness that allows determining a normal state of the reproduction when a variation that occurs in the manufacturing of the reproduction is within a range of an admissible error, and detects an abnormal state of the reproduction when a variation outside the admissible range has occurred.

Figure 10:
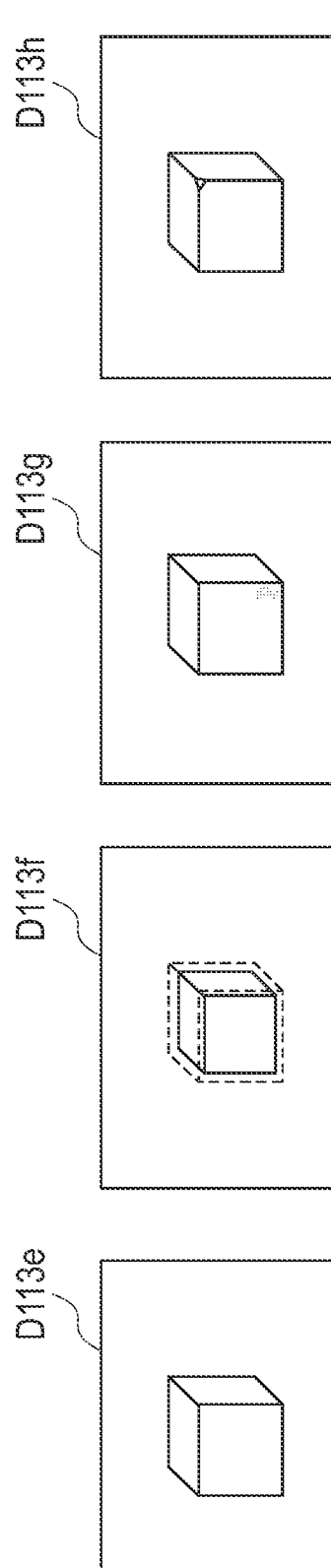
FIG. 10 is a diagram indicating an example of the normal images used for the construction of the learned model.
Figure 11:
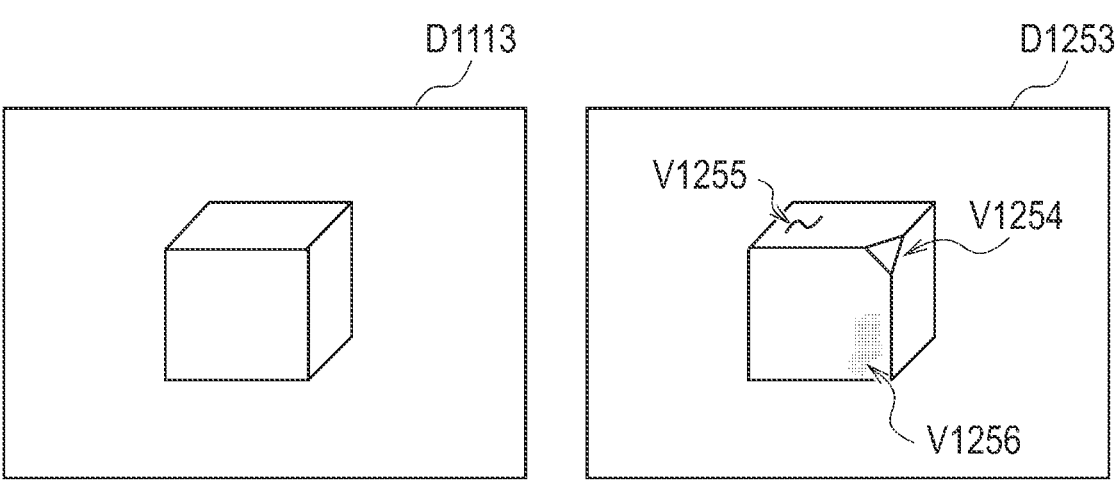
FIG. 11 is a diagram indicating an example of the detected abnormality.

For example, FIG. 10 is a diagram indicating an example of normal images used for the construction of a learned model in the present modification. Specifically, the normal image D113*e* is an image in which the subject is a reproduction generated according to standards. In contrast to this, the respective normal images D113*f* to D113*h* are images in which the subject is a reproduction in which a variation regarding the manufacturing has occurred in a range of an admissible error.

Specifically, the normal image D113*f* schematically indicates an image in which the subject is a reproduction in which a size variation has occurred in a range of an admissible error. The normal image D113*g* schematically indicates an image in which the subject is a reproduction in which a discoloration has occurred in at least a part of the reproduction in a range of an admissible error. The normal image D113*h* schematically indicates an image in which the subject is a reproduction in which a loss or deformation has occurred in a part of the reproduction in a range of an admissible error.

In the information processing system according to the present modification, with the normal image D113*e* among the normal images D113*e* to D113*h* indicated in FIG. 10 as the reference image D111, the respective other normal images D113*f* to D113*h* are inputted to the generation unit 101. Upon that, the discrimination unit 103 constituting the generation unit 101 and the GAN is caused to discriminate between the normalized image D115 generated by the generation unit 101 based on the respective other normal images D113*f* to D113*h* and the above-described reference image D111. Based on such configuration, the generation unit 101 constructs the learned model regarding the application of the normalization process on an input image so as to perform the normalization process that makes the discrimination between the reference image D111 and the normalized image D115 more difficult for the discrimination unit 103 on the inputted normal image D113.

Accordingly, the above-described learned model that can accurately generate the normalized image D115 having features that more closely resemble those of the reference image D111 based on an input image when the difference between the input image and the above-described reference image D111 is in a range that can be analogized based on the differences in features between the normal images D113*e* to D113*h* is constructed.

Moreover, at the time of inspecting the manufactured reproduced item, the generation unit 201 performs, on the captured image D123 corresponding to the captured result of the reproduced item, the normalization process of making the features of the captured image closer to the features of the above-described reference image D111 (normal image D113*e*) based on the above-described learned model, and thereby generates the normalized image D125. Upon that, the determination unit 203 determines whether a variation regarding the manufacturing outside an admissible range has occurred or not in the reproduction as the inspection target according to whether the generated normalized image D125 and the reference image D111 approximately match or not.

Note that, here, when the variation regarding the manufacturing having occurred in the manufactured reproduction is in a range that can be analogized based on the differences in features between the normal images D113*e* to D113*h*, the features of the normalized image D125 generated based on the captured image D123 of the reproduction approximately match the features of reference image D111. That is, in this case, the determination unit 203 determines that the reproduction as the inspection target has no problem (the variation regarding the manufacturing is within a range of an admissible error).

In contrast to this, when the variation regarding the manufacturing having occurred in the manufactured reproduction is difficult to be analogized based on the difference in features between the normal images D113*e* to D113*h*, the features of the normalized image D125 generated based on the captured image D123 of the reproduction do not approximately match the features of the reference image D111. That is, in this case, the determination unit 203 determines that the reproduction as the inspection target is a failure (the variation regarding the manufacturing is outside the range of an admissible error).

Here, with reference to FIG. 11, an example of an abnormality detected by a comparison between the normalized image D125 and the reference image D111 will be described by giving a specific example. D1113 indicates an example of the reference image D111 according to the present modification. The reference image D1113 is equivalent to the normal image D113*e* indicated in FIG. 10. D1253 indicates an example of the normalized image D125 in which the normalization process is performed on the captured image D123 of the reproduction as the inspection target using the learned model constructed based on the machine learning. Specifically, D1253 indicates an example of the normalized image D125 generated when the variation regarding the manufacturing having occurred in the reproduction as the inspection target is outside the range of an admissible error.

In the normalized image D1253, differences V1254, V1255, and V1256 that are not present in the reference image D1113 has appeared. Specifically, the difference V1254 schematically indicates a difference that has appeared by a loss or deformation outside the range of an admissible error having occurred in a part of the reproduction as the inspection target. The difference V1255 schematically indicates a difference that has appeared by a foreign matter that is not present at a normal time being mixed in. The difference V1253 schematically indicates a difference that has appeared by a discoloration outside the range of an admissible error having occurred in a part of the reproduction as the inspection target.

The variation regarding the manufacturing having occurred in the reproduced item as a factor of the respective differences V1254, V1255, and V1256 having appeared is equivalent to, as described above, the variation outside the range of an admissible error. Therefore, even by performing, on the captured image D123, a normalization process of making the features of the captured image D123 closer to features of the reference image D1113, the differences V1254, V1255, and V1256 appear in the generated normalized image D1253.

Using such characteristics, and thereby comparing the generated normalized image D1253 with the reference image D1111 and detecting differences (such as the differences V1251, V1252, V1253, and the like), it is possible to determine whether the variation regarding the manufacturing outside the range of an admissible error has occurred or not in the manufactured reproduction (that is, to perform the inspection of the reproduction).

Moreover, besides the variation exemplified in the above description, it is also possible to detect variations regarding the manufacturing that cannot be anticipated when the manufacturing is performed according to standards, such as a crack, stain, deformation, or abnormal size.

CONCLUSION

As described above, the information processing apparatus 200 according to the present embodiment performs a normalization process using a learned model constructed in advance based on the machine learning with a plurality of normal images as input on an input image to generate a normalized image, and upon determining whether the normalized image and a prescribed reference image approximately match or not, outputs notification information according to a result of the determination to a prescribed output destination.

With such configuration, while having a robustness that allows determining a normal state of a reproduction when a change having appeared in the input image is within an admissible range, it is possible to detect an abnormal state of a reproduction when a change outside the admissible range has appeared. Accordingly, for example, even under circumstances where the state of a prescribed target is monitored using a captured image corresponding to a captured result of an image-capturing device, while further suppressing an occurrence of an excessive detection of detecting a change of state that can be anticipated as an abnormality, an occurrence of abnormality can be detected with higher accuracy.

The information processing apparatus 100 according to the present embodiment constructs a learned model that performs a normalization process of making features of an input image closer to features of a prescribed reference image on the input image and thereby is generated in a normalized image based on the machine learning. Specifically, the information processing apparatus 100 uses a generative adversarial network constituted of a combination of the learned model and a discriminator. With any of a plurality of normal images as the reference image, the discriminator discriminates between the normalized image generated by the normalization process being performed on other normal images other than the reference image among the plurality of normal images by the learned model and the above-described reference image. By using the generative adversarial network, the information processing apparatus 100 constructs the above-described learned model so as to perform, on an input image, the above-described normalization process that makes the discrimination between the normalized image and the reference image more difficult for the discriminator.

With such configuration, it is possible to construct the above-described learned model even under circumstances where it is difficult to prepare an image indicating an abnormal state. Moreover, with the above-described configuration, it is possible to construct the learned model that can generate a normalized image having features that approximately match those of the reference image based on an input image when the change having appeared in the input image is a change in a range that can be analogized from features of the above-described plurality of normal images. Furthermore, in the information processing system according to the present embodiment, by limiting the reference images as the comparison target of the normalized image, a processing load regarding the construction of the learned model can be further reduced.

Note that, as described above, the data used for the construction of the learned model is not necessarily limited only to data of image, and data of other types may be used. In this case, the learned model is constructed by a plurality of pieces of correct data (data equivalent to the normal images) being inputted. Specifically, the learned model is constructed such that any among the plurality of pieces of correct data is used as reference data (data equivalent to the reference image), and the normalization process of making features of other data closer to features of the reference data is performed on the other data.

As a more specific example, when acoustic data is used as input, the learned model is constructed so as to perform, on the inputted acoustic data, a normalization process of making features of the acoustic data closer to features of reference acoustic data.

Moreover, at the time of determination using the learned model, the data inputted to the learned model (that is, data on which the normalization process is performed) is mainly data of the same type as that of the reference data. Obviously, according to the type of data inputted to the learned model, the configuration regarding the obtainment of the data (configuration equivalent to the image-capturing device 300 in a case where data of image is the target) may be appropriately changed. Also, based on a comparison between the data on which the normalization process is performed by the learned model (data equivalent to the normalized image) and the reference data, a desired determination (for example, a determination of whether an abnormality is detected or not or the like) is performed.

While the present invention has been described above together with the embodiment described above, the present invention is not limited only to the embodiment described above. Various kinds of modifications and the like can be made in a range that does not depart from the technical idea of the present invention, and the embodiment or the modification described above may be combined in a timely manner.

In addition, the present invention includes a method for achieving the functions of the embodiment described above, a program, and a storing medium that can be read by a computer storing the program.

REFERENCE SIGNS LIST

1 . . . information processing system
100 . . . information processing apparatus 101 . . . generation unit
103 . . . discrimination unit
110 . . . learning processing unit
200 . . . information processing apparatus
201 . . . generation unit
203 . . . determination unit
205 . . . output control unit
300 . . . image-capturing device
400 . . . terminal device

The invention claimed is:

1. An information processing apparatus comprising:
a generator configured to generate a normalized image by performing a normalization process using a learned model constructed in advance based on a machine learning with a plurality of normal images as input, on an input image;
a determiner configured to determine whether the normalized image and a prescribed reference image approximately match or not; and
an outputter configured to output notification information according to a result of the determination to a prescribed output destination.

2. The information processing apparatus according to claim 1, wherein
the learned model:
with any of the plurality of normal images as the reference image;
is constructed so as to perform the normalization process of making a feature of an input image closer to a feature of the reference image on the input image.

3. The information processing apparatus according to claim 2, wherein
the learned model:
constitutes a discriminator and a generative adversarial network in the machine learning, the discriminator being configured to discriminate between the normalized image generated by performing the normalization process on other normal images other than the reference image among the plurality of normal images and the reference image; and
is constructed so as to perform the normalization process that makes a discrimination between the normalized image generated by a respective plurality of the other normal images and the reference image more difficult for the discriminator, on an input image.

4. The information processing apparatus according to claim 3, wherein
the learned model uses the other normal images having a feature that more closely resembles a feature of the reference image to generate the normalized image as a target of a discrimination by the discriminator.

5. The information processing apparatus according to claim 1, wherein
the plurality of normal images include a plurality of images having mutually different conditions regarding image capturing.

6. The information processing apparatus according to claim 5, wherein
the condition regarding image capturing includes at least one of a condition related to a capturing environment, a condition related to a parameter regarding image capturing of an image-capturing device, and a condition related to a subject.

7. The information processing apparatus according to claim 6, wherein the condition related to a capturing environment includes a condition related to a lighting environment.

8. The information processing apparatus according to claim 6, wherein
the condition related to a subject includes a condition related to a state of a prescribed subject.

9. The information processing apparatus according to claim 6, wherein
the condition related to a subject includes a condition related to a variation regarding a generation of a reproduction as the subject.

10. The information processing apparatus according to claim 1, wherein
the determiner is configured to determine whether the normalized image and the reference image approximately match or not by comparing the normalized image and the reference image by a pixel unit.

11. The information processing apparatus according to claim 10, wherein
the determiner is configured to determine whether the normalized image and the reference image approximately match or not by comparing the normalized image and the reference image by a pixel unit for each color component constituting the pixel.

12. The information processing apparatus according to claim 1, wherein
the outputter is configured such that the outputter outputs the notification information indicating an abnormality to a prescribed destination when the normalized image and the reference image are determined not to approximately match.

13. An information processing method executed by an information processing apparatus, comprising:
a generating step of generating a normalized image by performing a normalization process using a learned model constructed in advance based on a machine learning with a plurality of normal images as input, on an input image;
a determining step of determining whether the normalized image and a prescribed reference image approximately match or not; and
an outputting step of outputting notification information according to a result of the determination to a prescribed output destination.

14. A non-transitory computer-readable medium storing instructions executable by a processor of an information processing apparatus, wherein the instructions, when executed, cause to the processor to execute:
a generating step of generating a normalized image by performing a normalization process using a learned model constructed in advance based on a machine learning with a plurality of normal images as input, on an input image;
a determining step of determining whether the normalized image and a prescribed reference image approximately match or not; and
an outputting step of outputting notification information according to a result of the determination to a prescribed output destination.

15. An information processing apparatus comprising:
a constructor configured to construct a learned model configured to generate a normalized image by performing a normalization process of making a feature of an input image closer to a feature of a prescribed reference image on the input image, based on a machine learning, wherein
the constructor:

with any of a plurality of normal images as the reference image;

by using a generative adversarial network constituted of a combination of the learned model and a discriminator configured to discriminate between the normalized image and the reference image, the normalized image being generated by the normalization process performed on other normal images other than the reference image among the plurality of normal images by the learned model; and constructs the learned model so as to perform the normalization process that makes a discrimination between the normalized image and the reference image more difficult for the discriminator, on an input image.

16. An information processing method executed by an information processing apparatus, comprising:

a constructing step of constructing a learned model configured to generate a normalized image by performing a normalization process of making a feature of an input image closer to a feature of a prescribed reference image on the input image, based on a machine learning, wherein in the constructing step:

with any of a plurality of normal images as the reference image;

by using a generative adversarial network constituted of a combination of the learned model and a discriminator configured to discriminate between the normalized image and the reference image, the normalized image being generated by the normalization process performed on other normal images other than the reference image among the plurality of normal images by the learned model; and the learned model is constructed so as to perform the normalization process that makes a discrimination between the normalized image and the reference image more difficult for the discriminator, on an input image.

17. A non-transitory computer-readable medium storing instructions executable by a processor of an information processing apparatus, wherein the instructions, when executed, cause to the processor to execute:

a constructing step of constructing a learned model configured to generate a normalized image by performing a normalization process of making a feature of an input image closer to a feature of a prescribed reference image on the input image, based on a machine learning, wherein in the constructing step:

with any of a plurality of normal images as the reference image;

by using a generative adversarial network constituted of a combination of the learned model and a discriminator configured to discriminate between the normalized image and the reference image, the normalized image being generated by the normalization process performed on other normal images other than the reference image among the plurality of normal images by the learned model; and the learned model is constructed so as to perform the normalization process that makes a discrimination between the normalized image and the reference image more difficult for the discriminator, on an input image.

* * * * *